United States Patent
Yoo et al.

(10) Patent No.: US 9,118,058 B2
(45) Date of Patent: Aug. 25, 2015

(54) BATTERY PACK HAVING A FLAT EXTERNAL SHAPE AND DESIGNED FOR SMALLER AND LIGHTER DEVICES

(75) Inventors: Martin Yoo, Yongin-si (KR); Jin-Tae Hong, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 750 days.

(21) Appl. No.: 13/162,444

(22) Filed: Jun. 16, 2011

(65) Prior Publication Data

US 2012/0009444 A1    Jan. 12, 2012

(30) Foreign Application Priority Data

Jul. 12, 2010   (KR) .................. 10-2010-0066861

(51) Int. Cl.
H01M 14/00 (2006.01)
H01M 2/10 (2006.01)
G06F 1/16 (2006.01)
H01M 10/42 (2006.01)

(52) U.S. Cl.
CPC ............. H01M 2/105 (2013.01); G06F 1/1635 (2013.01); H01M 2/1061 (2013.01); H01M 2/1094 (2013.01); H01M 10/425 (2013.01); H01M 2200/00 (2013.01); H01M 2220/30 (2013.01)

(58) Field of Classification Search
CPC . H01M 2/105; H01M 2/1061; H01M 2/1094; H01M 2200/00; H01M 2220/30; H01M 10/425; G06F 1/1635
USPC .......................................................... 429/7
See application file for complete search history.

(56) References Cited

U.S. PATENT DOCUMENTS

| 2003/0180582 A1 | 9/2003 | Masumoto et al. |
| 2004/0251872 A1 | 12/2004 | Wang et al. |
| 2005/0164080 A1 | 7/2005 | Kozu et al. |
| 2007/0096688 A1* | 5/2007 | Suzuki et al. ................. 320/112 |
| 2007/0184341 A1 | 8/2007 | Yoon et al. |
| 2007/0264562 A1 | 11/2007 | Kang et al. |
| 2009/0081539 A1 | 3/2009 | Koh et al. |
| 2009/0258285 A1 | 10/2009 | Kim |
| 2009/0297891 A1 | 12/2009 | Byun et al. |

(Continued)

FOREIGN PATENT DOCUMENTS

| CN | 2631052 Y | 8/2004 |
| CN | 101393996 A | 3/2009 |

(Continued)

OTHER PUBLICATIONS

Japanese Office Action issued on Oct. 30, 2012 by JPO in connection with Japanese Patent Application No. 2010-249706, which claims Korean Patent Application No. 10-2010-0066861 as its priority document and Request for Entry of the Accompanying Office Action attached herewith.

(Continued)

Primary Examiner — Gary Harris
(74) Attorney, Agent, or Firm — Robert E. Bushnell, Esq.

(57) ABSTRACT

An embodiment of the present invention relates to a battery pack including a plurality of bare cells each having a cap assembly and a bottom positioned to correspond to the cap assembly; a protection circuit module mounted on the bare cells; a cover frame covering the bare cells and composed of a first frame and two second frames; and an enclosure member covering the bare cells.

15 Claims, 16 Drawing Sheets

(56) References Cited

U.S. PATENT DOCUMENTS

2009/0317703 A1  12/2009  Kwag et al.
2010/0124674 A1*  5/2010  Kwag ............................... 429/7

FOREIGN PATENT DOCUMENTS

| | | |
|---|---|---|
| CN | 101740800 A | 6/2010 |
| EP | 2190045 A1 | 5/2010 |
| EP | 2207222 A1 | 7/2010 |
| JP | 10-092401 | 4/1998 |
| JP | 2003162987 | 6/2003 |
| JP | 2003234096 | 8/2003 |
| JP | 2006-164558 A | 6/2006 |
| JP | 2006164579 | 6/2006 |
| JP | 2008034296 | 2/2008 |
| JP | 2009259778 | 11/2009 |
| JP | 20103691 | 1/2010 |
| JP | 2010-123568 | 6/2010 |
| KR | 10-0497252 | 6/2005 |
| KR | 10-0553200 | 2/2006 |
| KR | 10-0601531 | 7/2006 |
| KR | 10-2007-0080861 A | 8/2007 |
| KR | 1020070094064 | 9/2007 |
| KR | 10-2009-0031159 A | 3/2009 |
| KR | 10-2009-0051870 | 5/2009 |
| WO | 2007-075019 A1 | 7/2007 |

OTHER PUBLICATIONS

EPOA issued by European Patent Office on Jul. 29, 2013 of EP Patent application No. 11173417.4, which claims priority of the corresponding KR Patent application No. 10-2010-0066861.

CNOA issued by SIPO on Jul. 31, 2013 of Chinese Patent application No. 201110196561.X, which claims priority of the corresponding KR Patent application No. 10-2010-0066861. English Translation of this CNOA is attached.

Korean Notice of Allowance issued Apr. 25, 2012 in connection with Korean Patent Application Serial No. 10-2010-0066861 and Request for Entry of the Accompanying Office Action attached herewith.

The Korean Office action issued by Korean Patent Office on Sep. 23, 2011, corresponding to KR 10-2010-0066861 and Request for Entry attached herewith.

* cited by examiner

BATTERY PACK HAVING A FLAT EXTERNAL SHAPE AND DESIGNED FOR SMALLER AND LIGHTER DEVICES

CLAIM OF PRIORITY

This application makes reference to, incorporates the same herein, and claims all benefits accruing under 35 U.S.C. §119 from an application earlier filed in the Korean Intellectual Property Office on 12 Jul. 2010 and there duly assigned Serial No. 10-2010-0066861.

BACKGROUND OF THE INVENTION

1. Field of the Invention

An embodiment of the present invention relates to a battery pack used for portable electronic devices, and particularly to a battery pack that is manufactured at a low manufacturing cost by simplifying the structure of the battery pack and possibly implementing a thin electronic device equipped with the battery pack.

2. Discussion of Related Art

In general, a battery pack equipped with a plurality of built-in bare cells is used as a power supplier of portable electronic devices. The external appearance of the battery pack depends on the electronic device to be equipped with the battery pack.

As the weight and thickness of portable electronic devices reduce, battery packs implemented in the electronic devices are required to become lighter and smaller. Further, the battery packs are required to be more stable against a fall and an external shock.

SUMMARY OF THE INVENTION

An embodiment of the present invention implements a small-sized and thin battery pack equipped with a plurality of built-in bare cells.

Further, an embodiment of the present invention provides a battery pack that is electrically stable without using an enclosure case by changing the internal structure of the battery pack.

Further, an embodiment of the present invention provides a battery pack of which the external shape may be easily changed in accordance with the structure of the electronic devices using the battery pack.

An embodiment of the present invention provides a battery pack described as follows.

An aspect of the present invention provides a battery pack including a plurality of bare cells each having a cap assembly and a bottom disposed opposite to and corresponding to the cap assembly; a protection circuit module mounted on the bare cells; a cover frame covering the bare cells and composed of a first frame and two second frames; and an enclosure member covering the bare cell.

The second frames of the cover frame may respectively extend from both ends of the first frame. In this configuration, the first frame covers one side of the bare cell and the second frame covers the cap assembly and the bottom of the bare cell. Further, the first frame has a seat having a shape corresponding to the one side of the bare cell in order to physically contact the one side of the bare cell. The first frame further may have a receiving portion that is a groove receiving the protection circuit module, and the position of the receiving portion corresponds to the position of the protection circuit module on the bare cell. Further, the second frames may have fixing portions having shapes corresponding to the cap assembly and the bottom of the bare cell and the second frames may fix the cap assembly and the bottom of the bare cell to the cover frame. The second frames may be linearly connected to and extends from the first frame, and the second frames may rotate at ±90° to with respect to the first frame.

The cover frame may be made of thermoplastic resin and the enclosure member may further have an adhesive layer on the surface contacting the bare cells.

The enclosure member may further cover the bare cell and a portion of the cover frame contacting one side of the bare cell.

The battery pack may further include a spacer filling a space between the bare cells and the enclosure member such that the surface of the enclosure member and the surface of the first frame which are in physical contact with each other are parallel. The cover frame may have a protrusion extruding towards an exterior of the battery pack and the protrusion corresponds to the protection circuit module. The protection module may have an external terminal and the external terminal may be connected to the exterior of the battery pack through a terminal leading unit disposed on the protrusion.

Fastening structures may be formed at two opposite sides of the cover frame, for combination with an electronic device equipped with the battery pack.

The bare cell may be a cylindrical or rectangular bare cell.

A battery pack constructed as the present invention may be reduced in size and weight by covering only a portion of the bare cells.

Further, the configuration of the cover pack of the battery pack constructed as the present invention is simplified. Therefore, the external shape of the battery pack may be implemented in various ways in accordance with an electronic device equipped with the battery pack.

Further, the battery pack constructed as the present invention includes fixing portions that fix the cap assembly and the bottom of the cell in the battery pack. Therefore, the bare cell may be firmly fixed, without moving around within the battery pack.

Further, the cover frame of the battery pack constructed as the present invention has a groove for receiving the protection circuit module. Therefore, it is possible to achieve a slim battery pack by seating the protection circuit module mounted on the bare cell inside the cover frame.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
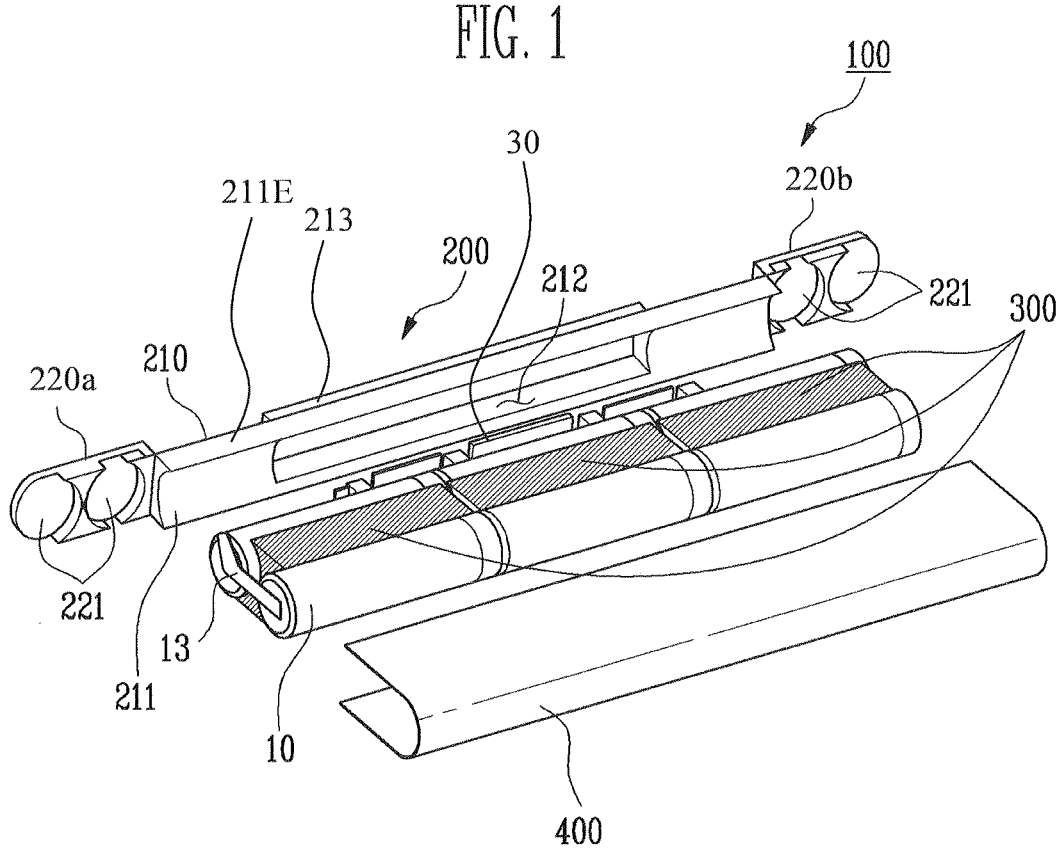
FIG. 1 is an exploded oblique view showing a battery pack constructed as an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or be indirectly on the another element with one or more intervening elements interposed therebetween. Also, when an element is referred to as being "connected to" another element, it may be directly connected to the another element or be indirectly connected to the another element with one or more intervening elements interposed therebetween. Hereinafter, like reference numerals refer to like elements.

Embodiments of the present invention and other information for those skilled in the art to easily understand the present invention are described hereafter in detail with the accompanying drawings. However, the present invention may be changed and modified in various ways within the scope described in claims; therefore, it can be understood by those skilled in the art that the embodiment described below are just exemplified.

When it is determined that detailed descriptions for well-known technologies may unnecessarily make the point of the present invention unclear, the detailed descriptions are not provided, in explaining the present invention. Further, even if the same components are shown in different figures of the drawings, it should be noted that they are represented by as the same reference numerals or characters as possible. In addition, the size or thickness may be exaggerated or reduced in the drawings for the convenience of description and clarity, and may be different from the thickness or size of the actual layers.

The configuration and operation of embodiments constructed as the present invention are described hereafter in detail with reference to the accompanying drawings.

A battery pack constructed as the present invention is described hereafter with reference to the accompanying drawings. The battery pack is a thin light battery pack.

FIGS. 1 through 8 are views showing a battery pack in accordance with an embodiment of the present invention.

FIG. 1 is an exploded view showing a battery pack constructed as an exemplary embodiment of the present invention.

Referring to FIG. 1, a battery pack 100 includes a cylindrical bare cell 10, a protection circuit module 30, a cover frame 200, a spacer 300, and an enclosure member 400. That is, the battery pack 100 includes one or more bare cells 10, a protection circuit module 30 is electrically connected with the bare cells 10, a frame 200 covering the joint between the bare cell 10 and the protection circuit module 30, an enclosure member 400 covering the bare cell 10, and a spacer 300 disposed in a space between the bare cell 10 and the enclosure member 400.

Figure 2:
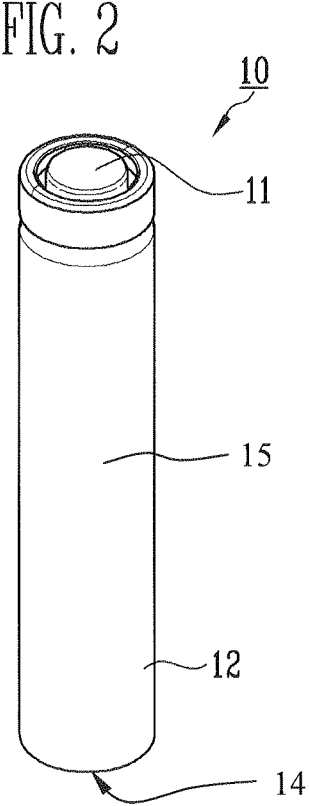
FIG. 2 is an oblique view of a cylindrical bare cell accommodated in a battery pack constructed as an embodiment of the present invention.

FIG. 2 shows a cylindrical bare cell 10 that is accommodated in the battery pack according to this embodiment.

Referring to FIG. 2, the bare cell 10 that is accommodated in the battery pack 100 has a cylindrical shape. The bare cell 10 is composed of a can 12 having an opening and a cap assembly 11 closing the opening of the can 12. Further, the base 14 which is sometimes referred to as the bottom 14 is positioned to correspond to the opening of the can 12. Though not shown, an electrode assembly and an electrolyte are accommodated within the can 12. The electrode assembly may be formed by winding an anode plate, a cathode plate, and a separator interposed between the electrode plates. The anode plate and the cathode plate each having an electrode tap and the electrode taps may be connected with the can 12 and the cap assembly 11. Therefore, electric energy produced by chemical reaction between the electrode plates and the electrolyte may be transmitted to the outside by the electrode taps. One or more of series of the bare cells 10 having the above configuration may be connected in parallel to the battery pack 100. Six cylindrical bare cells 10 are shown in FIG. 1 as an example. In FIG. 1, three of the six bare cells 10 may be connected in a series and two series of bare cells may be connected in parallel. That is, the bare cells 10 are arranged in 3S2P. FIG. 1 shows an exemplary embodiment and the present invention, but is not limited thereto. The number and connection type of the bare cells 10 may be modified in accordance with different designs of the battery pack.

Referring to FIG. 1, the protection circuit module 30 may be disposed at a side of the bare cell 10. The protection circuit module 30 may prevent the bare cell 10 from being overcharged or overdischarged by controlling voltage and current when the bare cell 10 is charged or discharged. Therefore, the protection circuit module 30 may include a protection device controlling voltage or current of the bare cell 10 or a mounted component, such as an external terminal. The external terminal may be exposed to the outside through the cover frame 200, and the bare cell may be electrically connected to the outside by the external terminal exposed to the outside. Further, the protection circuit module 30 may further include a conductive pattern on one side or both sides in order to electrically connect the mounted components.

Figure 3:
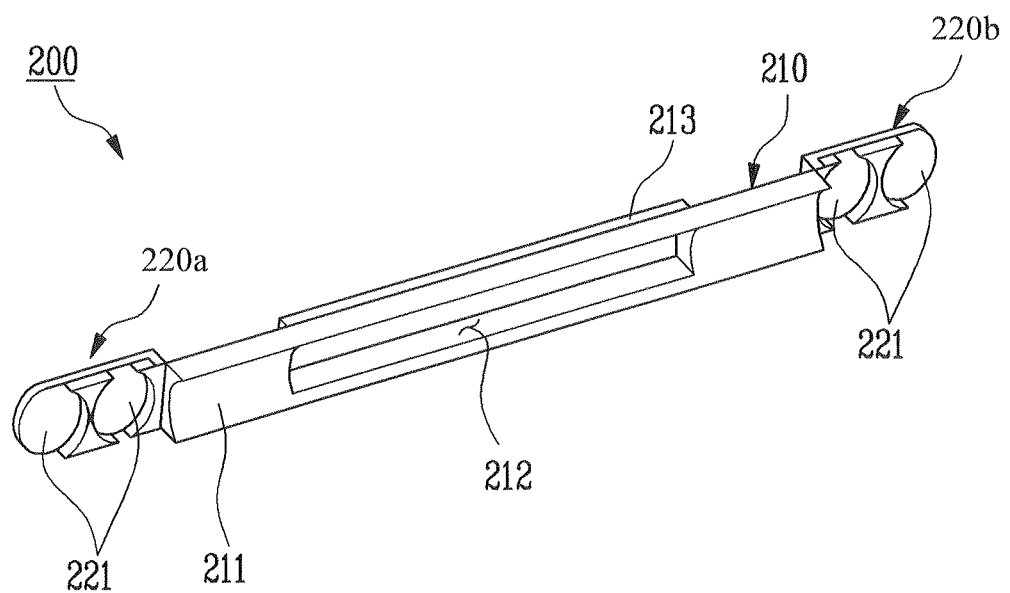
FIG. 3 is an oblique view showing a cover frame constructed as an embodiment of the present invention.

FIG. 3 is an oblique view showing a cover frame 200 constructed in this embodiment.

Referring to FIG. 3, the cover frame 200 has frames 210, 220a, and 220b covering a side of the bare cell 10. Further, the cover frame 200 protects the bare cell 10 against an external shock. The cover frame 200 is open at one side and composed of the first frame 210 and two second frames 220a, 220b. The first frame 210 is a longer part of the cover frame 200, covering a portion of the sides 15 of the cans 12 of the bare cells 10. The second frames 220a, 220b are shorter parts than the cover frame 200. The second frames 220a, 220b respectively extend from both ends of the first frame 210 and respectively cover any one or more of the cap assemblies 11 of the bare cells 10 and any one or more of the bases 14 of the cans 12. The second frames 220a, 220b may be integrally and simultaneously formed as a single body with the first frame 210, or may be separably formed and then connected to the first frame 210.

The first frame 210 of the cover frame 200 may cover the sides 15 of the can cans 12 of the bare cells 10.

A bare cell seat 211 may be formed inside the first frame 210. The bare cell seat 211 is a portion facing the side of the bare cell 10. That is, the seat 211 may be in physical contact with the sides 15 of the bare cells 10 when the cover frame 200 is mounted on the bare cell 10. In one embodiment, when the cover frame 200 is mounted on the bare cell 10, the seat 211 may be in direct physical contact with the sides 15 of the bare cells 10. Therefore, it is preferable that the seat 211 has a shape corresponding to the shape of the sides 15 of the bare cells 10. In this embodiment, the bare cells 10 each have a cylindrical shape and the seat 211 is curved to correspond to the cylindrical shape of the sides 15 of the bare cells 10.

Further, the first frame 210 may further have a protection circuit module receiving portion 212 therein. The receiving portion 212 may be a groove corresponding to where the protection circuit module 30 is mounted, and receives the protection circuit module 30. The protection circuit module 30 has a terminal and the terminal is electrically connected to the outside through a leading unit 214. This is described below.

Referring to FIG. 1, the protection circuit module 30 may be disposed at a side of the bare cell 10. As shown in the figures, when the protection circuit module 30 may be disposed at the joint of the bare cell 10 and the cover frame 200, the cover frame 200 is interfered by the protection circuit module 30, when the protection circuit module 30 is mounted on the bare cell 10. The interference may be prevented by forming the groove-shaped receiving portion 212 formed on the first frame 210 of the cover frame 200 to receive the protection circuit module 30. The first frame 210 of the cover frame 200 is the portion contacting the portion where the protection circuit module 30 is disposed on the bare cells 10. Therefore, since the protection circuit module 30 is received within the receiving portion 212, the bare cell 10 is in a good physical contact with the seat 211 of the first frame 210. The position of the protection circuit module 30 on the bare cells 10 may be modified in various ways. Further, although the receiving portion 212 shown in the figures is a rectangular groove, the shape is not limited thereto as long as the receiving portion 212 does not damage the protection circuit module 30.

The second frames 220a and 220b of the cover frame 200 are the portions covering the bottom 14 and the cap assembly 11 respectively of the can 12 of the bare cell 10.

The second frames 220a and 220b respectively extend from both ends of the first frame 210 and respectively cover the bottom or the cap assembly of the bare cell 10. The second frames 220a and 220b are two pieces covering the bottom and the cap assembly of the cylindrical bare cell 10. Bare cell fixing portions 221 are formed inside the first frame 210. The fixing portions 221 are two circular grooves. The grooves have shapes corresponding to the cap assembly and the bottom of the bare cell 10. The fixing portions 221 fix to the cap assembly and the bottom of the bare cell 10 while reinforcing the combination of the cover frame 200 and the bare cell 10. The shape and number of the fixing portions 221 depends on the shape, number, and connection type of the bare cell 10 received inside the cover frame 200, and are not limited to those shown in the figures. For example, when the cap assembly and the bottom of the bare cell 10 are rectangles, the fixing portions 221 may be rectangles corresponding to the shapes of the cap assembly and the bottom of the bare cell 10. Further, when three series of the bare cells 10 are connected in parallel, different from the figures, the fixing portion 221 of the second frame may have three grooves each corresponding to each series of the bare cells 10.

Figure 4:
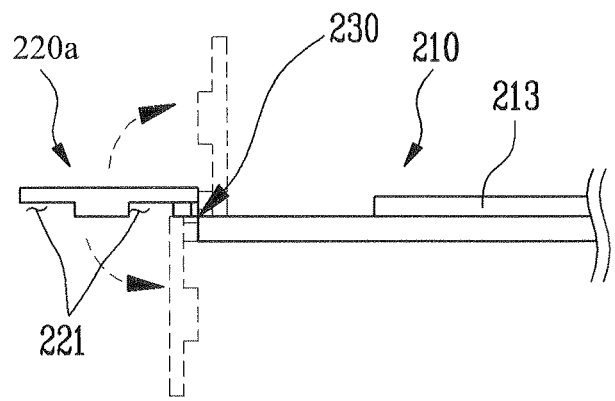
FIG. 4 is a plan view showing the top of a connecting structure of a first frame and a second frame of the cover frame constructed as an embodiment of the present invention.

FIG. 4 is a plan view showing the top of a connecting structure of the first frame 210 and the second frame 220a of the cover frame.

Referring to FIG. 4, the second frame 220 extends from the first frame 210, but is not fixed. That is, the second frame 220 is linearly connected to the first frame 210 by a bending portion 230. The second frame may rotate at 90° to the left and right from the first frame 210 by the bending portion 230. Therefore, the bare cell 10 is easily fixed by the first frame 210, after being seated on the first frame 210. Further, the bending portion 230 may be implemented as a hinge. That is, when the cover frame 200 is made of a material that is difficult to machine, such as wood, using a hinge for connection may be useful.

Figure 5:
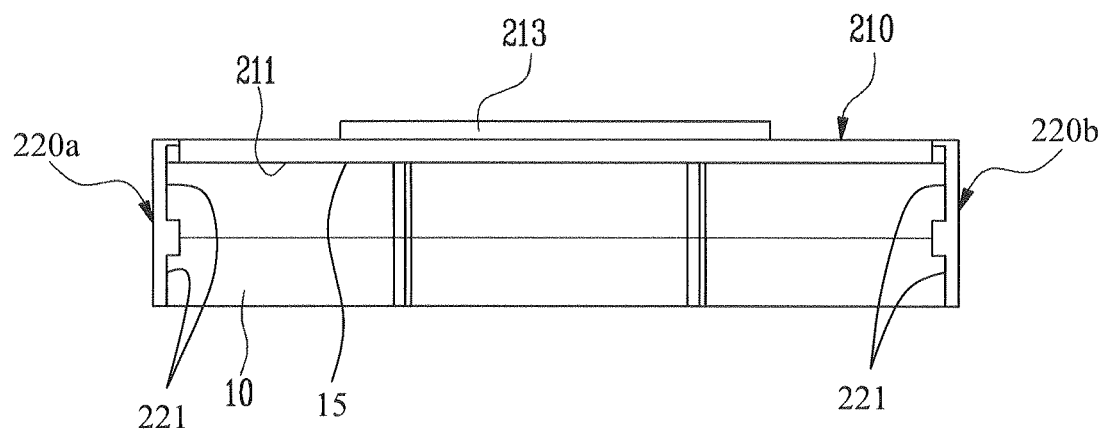
FIG. 5 is a plan view showing the top of an assembly of the cover frame and a bare cell constructed as an embodiment of the present invention.

FIG. 5 shows the top of an assembly of a bare cell and a cover frame.

That is, referring to FIG. 5, the side 15 of the can of the bare cell 10 is in physical contact with the first frame 210 of the cover frame 200, and the cap assembly 11 and the bottom 14 of the bare cell 10 are fixed by the second frame 220a or 220b of the cover frame 200. Therefore, the protection circuit module 30 disposed at the side of the bare cell 10 is received within the protection circuit module receiving portion 212 of the first frame 210 and the seat 211 of the first frame 210 is fitted on the side 15 of the bare cell 10. Further, the fixing portions 221 of the second frame 220 fix to the bare cell 10, covering the cap assembly 11 and the bottom 14 of the cell 10. Therefore, the bare cell 10 is firmly fixed to the cover frame 200 without moving inside the cover frame 200, and thus electrically stable.

The cover frame 200 having the first and second frames 210, 220 may be manufactured by injection molding. The cover frame 200 may be made of thermoplastic resin. For example, the cover frame may be made of any one or more of glassfiber and fiberglass reinforced plastics formed by adding plastic reinforcement to the glassfiber, but is not limited thereto.

Figure 6A:
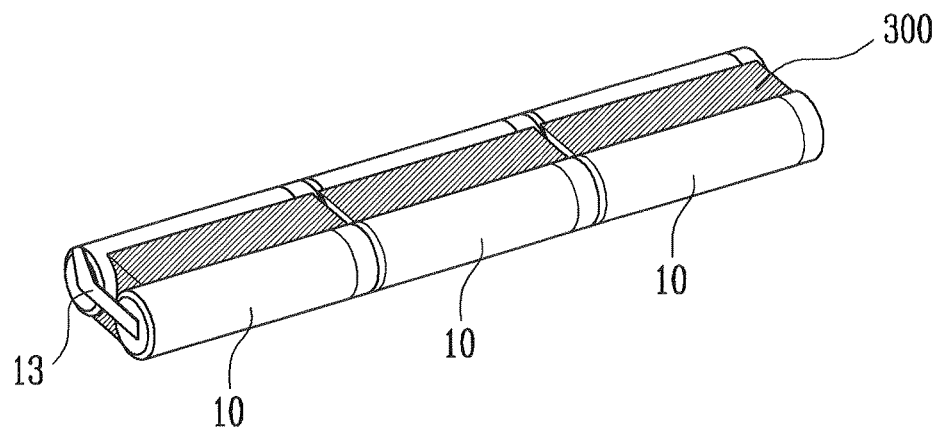
FIG. 6A is an oblique view showing an assembly of bare cells and a space constructed as an embodiment of the present invention.
Figure 6B:
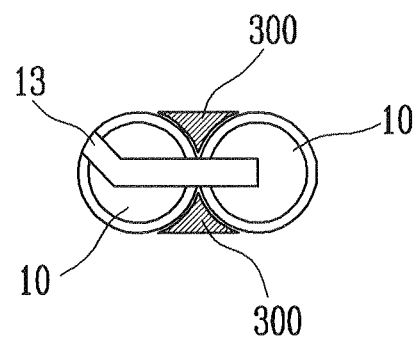
FIG. 6B is a side view of FIG. 6A showing an assembly of bare cells and a spacer constructed as an embodiment of the present invention.

FIG. 6A is an oblique view showing an assembly of bare cells and a space and FIG. 6B is a side view of FIG. 6A.

Referring to FIGS. 6A and 6B, the bare cells 10 are connected in parallel by an electrode lead 13 and the space between the bare cells 10 is filled with the spacer 300. The spacer 300 may be disposed on the top and the bottom of the bare cells 10 before the bare cells 10 are covered with the enclosure member 400 (see FIG. 1). The spacer 300 may be disposed before or after the bare cells 10 are received inside the cover frame 200. That is, the battery pack 100 according to this embodiment may further include the spacer 300 in the space between the bare cells 10 and the enclosure member 400 (see FIG. 1), such that the surfaces where the enclosure member 400 (see FIG. 1) and the first frame 210 are in perpendicular contact are parallel.

In detail, the shape of the battery pack 100 according to this embodiment depends on the electronic device equipped with the battery pack 100. In general, the battery pack 100 has a flat surface that contacts the electronic device. However, the battery pack 100 according to this embodiment includes the cover frame 200 covering only one side of the cylindrical bare cells 10 therein and the enclosure member 400 covering the exposed portion of the bare cell 10 (see FIG. 1). Further, even though the enclosure member 400 is a thin film, which is described below, the cylindrical bare cell 10 is not fully covered by the enclosure cover. That is, one bare cell 10 and another bare cell 10 are connected with a flat surface by filling the spacer 300 into the space disposed between the cylindrical bare cells 10 connected in parallel.

The spacer 300 may be an electrical insulator that may be made of an organic material or an inorganic material. Preferably, the spacer 700 may be made of any one or more of PE (polyethylene), PP (polypropylene), PES (polyethersulfone), PPO (polyphenyleneoxide), PSS (polyphenylene sulfide), PI (polyimide), and PET (polyethylene terephthalate).

Figure 7:
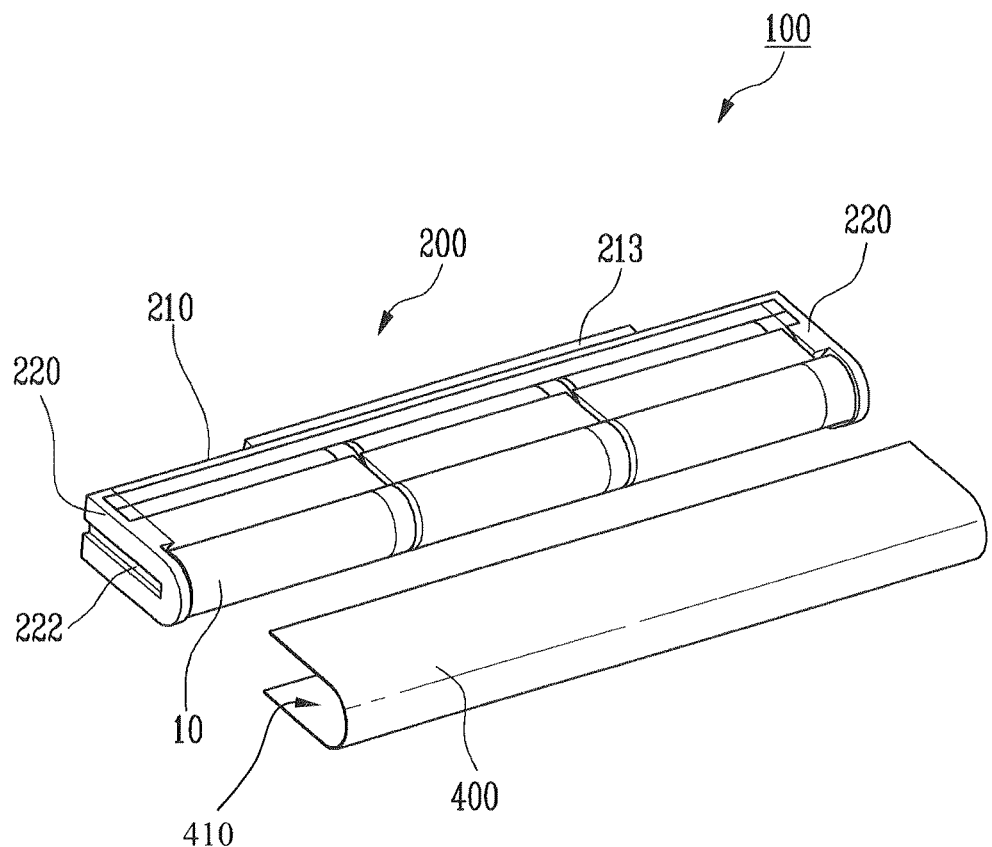
FIG. 7 is an exploded oblique view showing a battery pack constructed as an embodiment of the present invention.

FIG. 7 is an oblique view of the battery pack according to this embodiment.

Referring to FIG. 7, the enclosure member 400 covers the exposed portions of the bare cells 10 exposed by the cover frame 200, in the battery pack 100. Further, the portion of the bare cells 10 which is not covered by the cover frame 200 is covered by the enclosure member 400. The enclosure member 400 may cover only the bare cells 10, or alternatively, or may cover the bare cells 10 received inside the cover frame 200 and a portion of the first frame 210 of the cover case 200. In both types described above, the bare cells 10 may be shielded against the outside by the enclosure member 400. Meanwhile, when the enclosure member 400 covers a portion of the first frame 210, particularly covers the external surface 211E of the seat 211, the connection force between the bare cells 10 and the cover frame 200 may be increased.

Further, the enclosure member 400 may be an electrically insulating thin film. The external surfaces and the arrangement type of the bare cells 10 may be viewed through the enclosure member 400, even though the bare cells 10 are covered by the enclosure member 400. Therefore, as shown in FIG. 6, since the spacer 300 is disposed in the space between the bare cells 10 connected in parallel, the battery pack 100 has a flat external shape due to by the spacer 300, without being influenced by the shape of the secondary batteries 10 within the battery pack 100.

The enclosure member 400 may be generally made of synthetic resin, and for example, PC (polycarbonate) may be used, but it is not limited thereto. Further, an adhesive layer 410 may further provided inside the enclosure member 400, i.e., on the inner surface contacting the bare cells 10. The connection force between the enclosure 400 and the bare cells 10 may be further increased by the adhesive layer 410.

Figure 8:
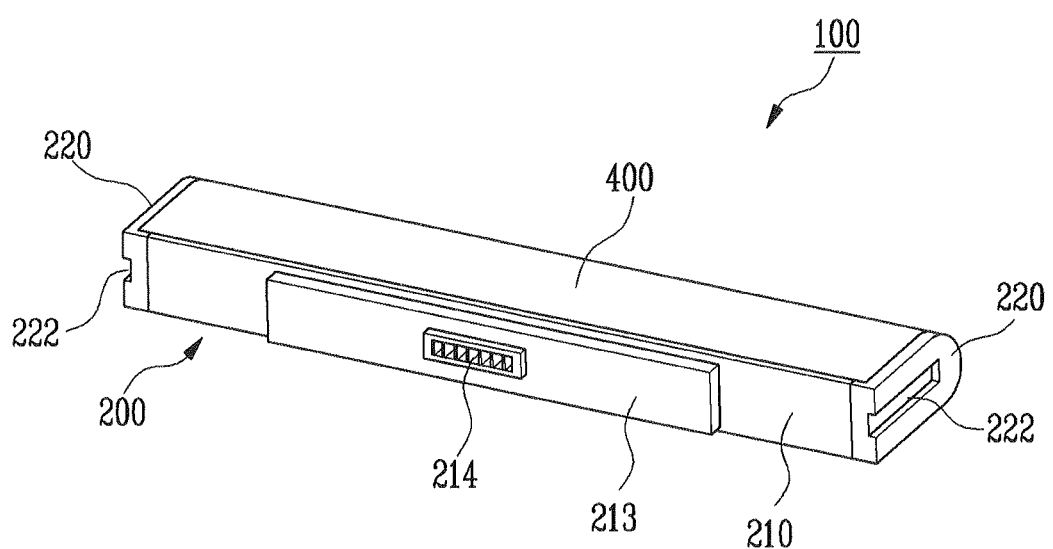
FIG. 8 is an oblique view showing a battery pack constructed as an embodiment of the present invention.

FIG. 8 is an oblique view of the battery pack according to this embodiment.

The battery pack 100 constructed in this embodiment includes the cover frame 200 having the first and second frames 210, 220a, 220b, and the enclosure member 400 covering the bare cells (not shown) in the battery pack 100 and a portion of the cover frame 200.

The first frame 210 of the cover frame 200 has the protection circuit module receiving portion 212 (see FIG. 3) therein. In the first frame 210, a protrusion 213 protruding outward is formed at a position corresponding to the receiving portion 212 and the terminal leading unit 214.

As described above, the protrusion 213 is formed to correspond to where the protection circuit module 30 is received inside the first frame 210. That is, the protrusion 213 protrudes outward from the first frame 210 as much as the portion of the protection circuit module 30 exceeds the thickness of the first frame 210. In this configuration, the protrusion 213 may be omitted when the thickness of the first frame 210 alone is large enough to include the whole protection circuit module; or when the protection circuit module is small enough to be sufficiently and wholly received within the receiving portion inside the first frame 210 with the thickness of the first frame 210 alone.

Further, the terminal leading unit 214 is formed at the center of the protrusion 213.

The external terminal formed at the protection circuit module 30 (see FIG. 1) on the side of the bare cell may be exposed by the terminal leading unit 214. The external terminal may be electrically connected to an electrical terminal of an electronic device equipped with the battery pack 100. The terminal leading unit 214 may be formed at other positions on the cover frame 200 in accordance with the structure of the battery pack 100. Further, the terminal leading unit 214, as shown in the figures, may protrude, but is not limited thereto.

Fastening structures 222 may be further formed on the sides of the cover frame 200, that is, the outer sides of the second frame 220. The fastening structure 222 is formed to fasten the battery pack 100 to an electronic device equipped with the battery pack 100.

Figure 9A:
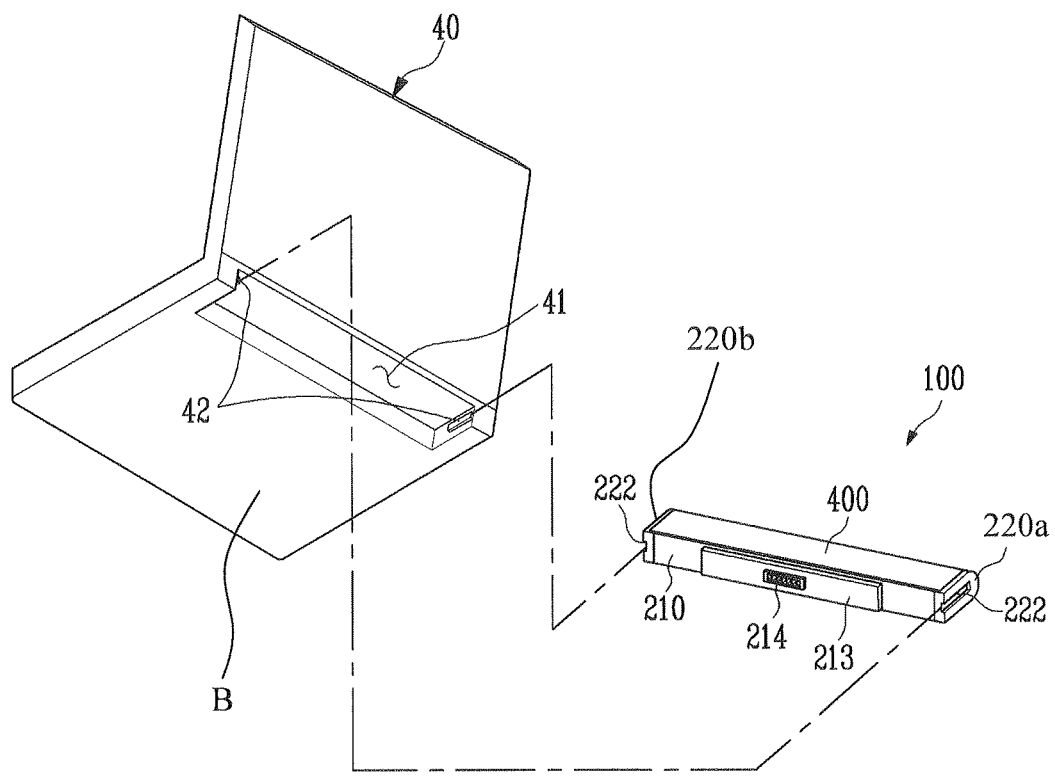
FIG. 9A is a view showing when a battery pack constructed as an embodiment of the present invention is mounted in the rear side of a laptop computer.
Figure 9B:
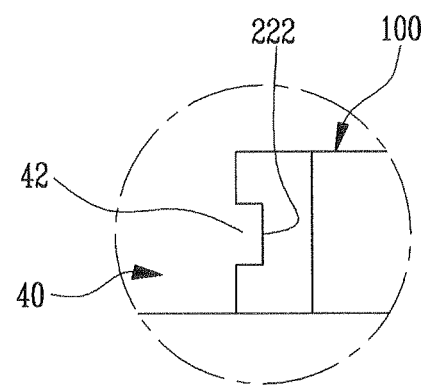
FIG. 9B is an enlarged cross-sectional view of the cross section when a fastening structure of the battery constructed as an embodiment of the present invention is fastened to the laptop computer.

FIG. 9A shows when the battery pack according to an embodiment of the present invention is mounted in the rear side of a laptop computer and FIG. 9B is an enlarged sectional cross-sectional view when a fastening structure 222 of the battery according to an embodiment of the present invention is fastened to the laptop computer 40. Further, FIG. 10 is an oblique view of a laptop computer 40 equipped with the battery pack.

Referring to FIGS. 9A and 9B, a power supply seat 41 where the battery pack 100 is mounted is formed on the back edge B of a laptop computer 40. Fastening protrusions 42 are formed on both sides inside the power supply seat 41. Further, fastening structures 222 may be formed on both sides of the battery pack 100, that is, the outer sides of the second frame 220. The fastening structures 222 may be long grooves corresponding to the fastening protrusions 42. Further, the fastening structures 222 are positioned to corresponding to the fastening protrusions 42 and fit to the fastening protrusions 42. That is, as shown in FIG. 9B, the battery pack 100 is firmly fixed in the laptop computer 40 by the fastening structures 222 and the fastening protrusions 42.

Figure 10:
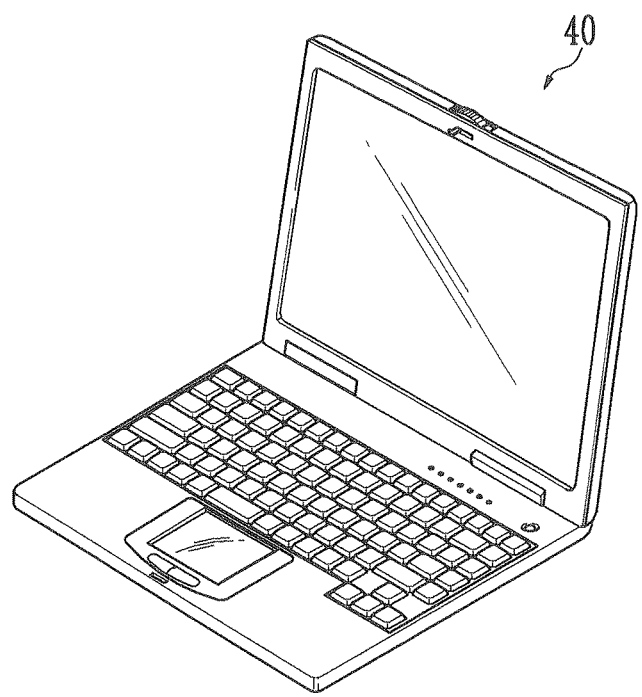
FIG. 10 is an oblique view showing a laptop computer equipped with a battery pack constructed as an embodiment of the present invention.

As shown in FIG. 9A, 9B, 10 the battery pack 100 is mounted in the laptop computer 40 by the fastening structures 222 of the battery pack, and the terminal leading unit 214 of the battery pack 100 is connected to a terminal (nor shown) in the seat 41 of the laptop computer 40. Therefore, it is possible to operate the laptop computer 40 by supplying power to the laptop computer 40. On the other hand, the battery pack 100 of this embodiment may be used for various external electronic devices, other than the laptop computer 40, and is not limited by the above description.

FIGS. 11 through 20 are views showing a battery pack constructed as another embodiment of the present invention.

Figure 11:
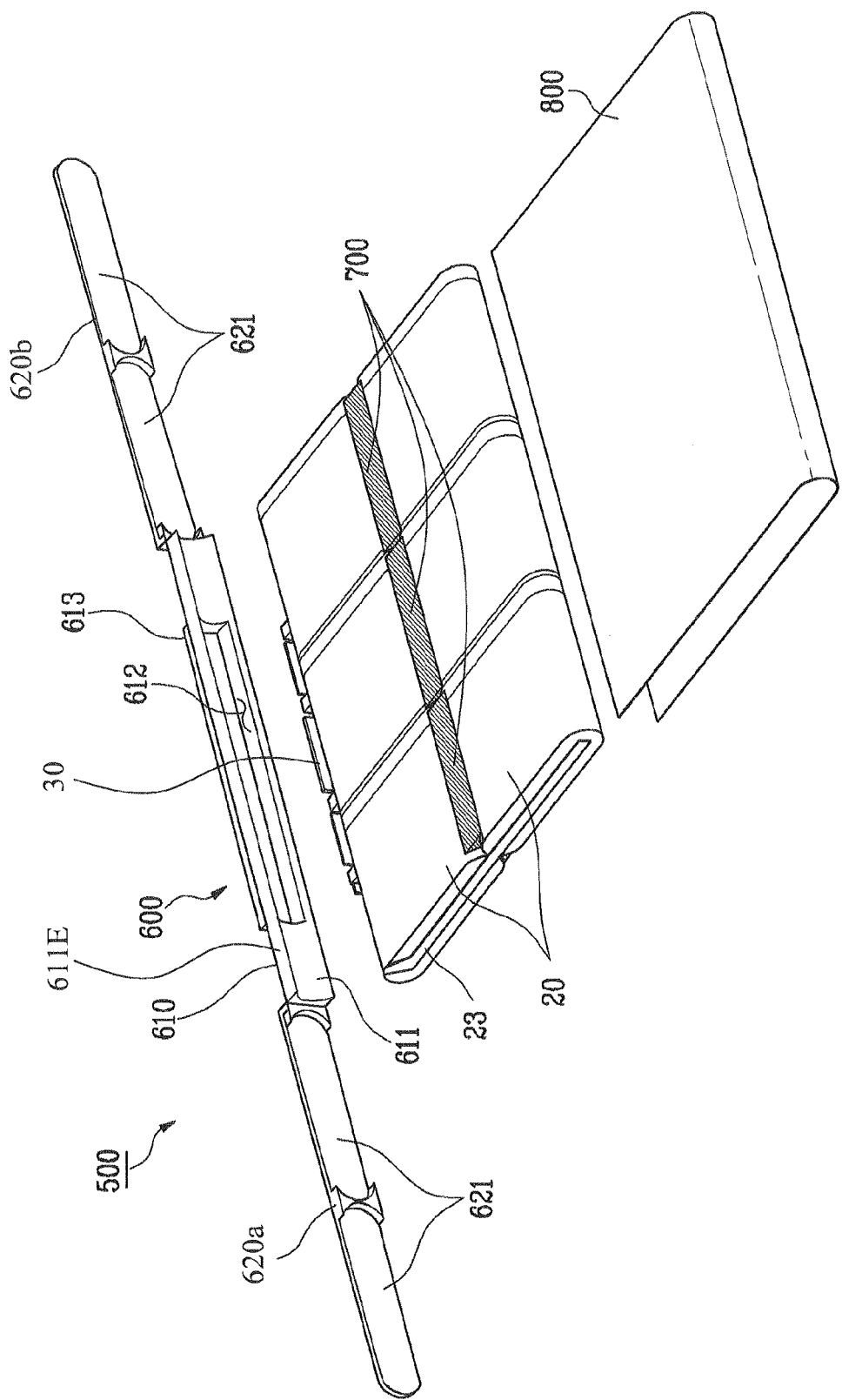
FIG. 11 is an exploded oblique view showing a battery pack constructed as another embodiment of the present invention.

FIG. 11 is an exploded view showing a battery pack according to another embodiment of the present invention.

Referring to FIG. 11, a battery pack 500 includes a rectangular bare cell 20, a protection circuit module 30, a cover frame 600, a spacer 700, and an enclosure member 800. That is, the battery pack 500 includes one or more bare cells 20, a protection circuit modules 30 connected with the bare cells 20, the cover frame 600 covering the joint between the bare cell 20 and the protection circuit module 30, an enclosure member 800 covering the bare cell 20, and a spacer 700 disposed in a space between the bare cell 20 and the enclosure member 800.

Figure 12:
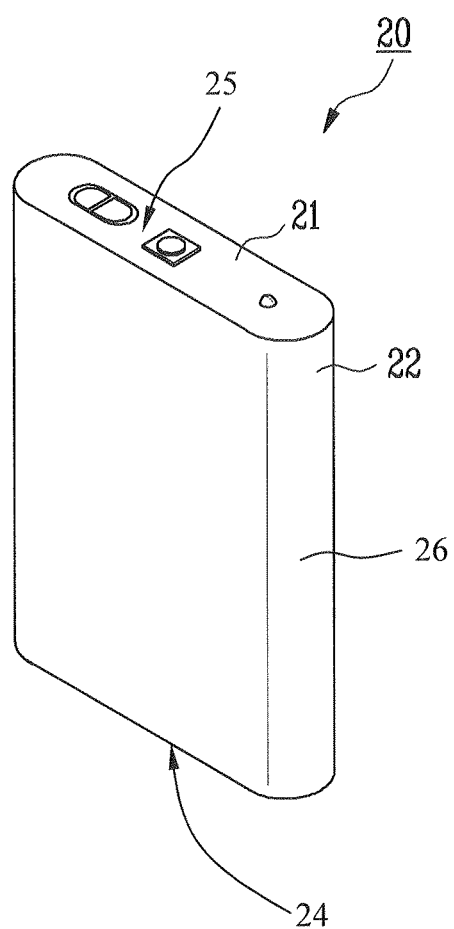
FIG. 12 is an oblique view of a rectangular bare cell accommodated in a battery pack constructed as another embodiment of the present invention.

FIG. 12 shows a rectangular bare cell that is accommodated in the battery pack according to this embodiment.

Referring to FIG. 12, the bare cell 20 that is accommodated in the battery pack 500 has a rectangular shape. The bare cell 20 is composed of a can 22 having an opening and a cap assembly 21 closing the opening of the can 22. Further, the bottom 24 is positioned opposite to the opening of the can 22. Though not shown, an electrode assembly and an electrolyte may be accommodated in the can 22. The electrode assembly is formed by winding an anode plate, a cathode plate, and a separator interposed between the electrode plates. The anode plate and the cathode plate each having an electrode tap, and the electrode taps are connected to the can 22 and the cap assembly 21. Therefore, electrical energy produced by chemical reaction between the electrode plates and the electrolyte is transmitted to the outside by the electrode taps. One or more of series of the bare cells 20 having the above configuration are connected to the battery pack 500 in parallel and in series. Six rectangular bare cells 20 are shown in FIG. 11. The six bare cells 20 are arrange in 3S2P, but are not limited thereto.

Referring to FIG. 11, the protection circuit module 30 may be disposed at a side of the bare cell 20 to control voltage or current when the bare cell 20 is charged/discharged. The bare cell 20 may be prevented from being overcharged or overdischarged by the protection circuit module 30. Therefore, the protection circuit module 30 may be equipped with an external terminal. The external terminal is electrically connected with the outside by the cover frame 600. The configuration and operation of the bare cell 20 and the protection circuit module 30, other than those described above, are the same as in the embodiment shown in FIG. 1, and the detailed description is not provided.

Figure 13:
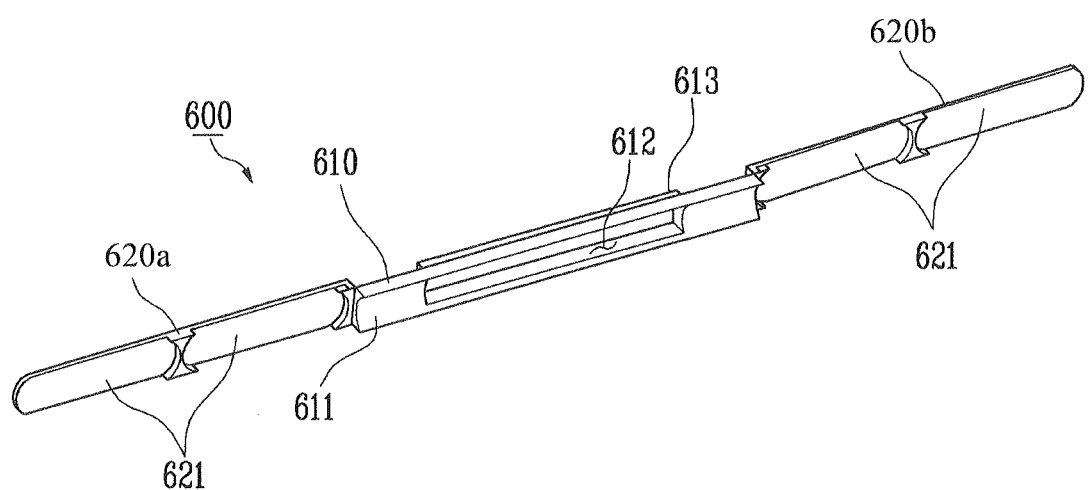
FIG. 13 is an oblique view showing a cover frame constructed as another embodiment of the present invention.

FIG. 13 is an oblique view showing the cover frame according to this embodiment.

Referring to FIG. 13, the cover frame 600 constructed as this embodiment has frames 610, 620a, 620b covering a sides of the bare cells 20. Further, the cover frame 600 protects the bare cells 20 against an external shock. The cover frame 600 is open at one side. The cover frame 600 is composed of the first frame 610 that is a longer part and two second frames 620a, 620b that are shorter parts. The second frames 620a, 620b respectively extend from both sides of the first frame 610. The second frames 620a, 620b may be integrally and simultaneously formed with the first frame 610 as a single body, or alternatively, the first and second frames 610, 620a, 620b may be separately formed and then connected to each other.

The cover frame 600, as shown in the figures, may cover the top 25, the bottom 24, and one side of the bare cells 20. The inner surface of the first frame 610 is curved and covers a side of the can of the bare cell 20. In one embodiment, the bare cell 20 has the top portion 25, the bottom portion 24 disposed opposite to and spaced apart from the top portion 25, and a side portion 26 connecting the top and bottom portions. The first frame 610 may cover at least a portion of the side portion 26 of the bare cells. In one embodiment, the side portion 26 may includes two opposite flat major surfaces and two opposite curved minor surfaces.

The curved inner surface of the first frame 610 is a cell seat 611. That is, the cover frame 600 contacts a side of the bare cell 20 by the seat 611. Therefore, the cell seat 611 has a shape corresponding to the shape of a side 26 of the bare cell 20 that has a rounded surface.

Further, the first frame 610 may further have a protection circuit module receiving portion 612 therein. The receiving portion 612 receives the protection circuit module 30. That is, the protection circuit module 30 disposed at the side of the bare cells interferes with contacting of the sides of the bare cells 20 to the seat 611 of the first frame 610. The bare cells 20 may be in contact with the first frame 610 without interference of the protection circuit module 30, by receiving the protection circuit module 30 in a groove 612 formed in the seat 611. Further, in the first frame 610, a protrusion 613 is formed at the opposite side corresponding to the protection circuit module receiving portion 612, and a terminal leading unit 614 is formed on the protrusion 613. The protrusion 613 and the terminal leading unit 614 are described below. Further, the position of the protection circuit module 30 in the bare cell 10 may be modified in various ways. Although the receiving portion 612 shown in the figures is a rectangular groove, the shape is not limited thereto, unless it damages the protection circuit module.

The second frames 620a and 620b of the cover frame 600 respectively extend from both ends of the first frame 610, and cover the cap assembly and the bottom of the can of the bare cells 20. Bare cell fixing portions 621 are formed inside the second frames 620a and 620b. The fixing portions 621 have shapes corresponding to the cap assembly and the bottom. The fixing portions 621 fix to the cap assembly and the bottom of the bare cells 20 while reinforcing the combination of the cover frame 600 to the bare cell 20. Further, the shape and number of the fixing portions 621 may be modified in various ways by the bare cells 20 received inside the cover frame 600.

Figure 14:
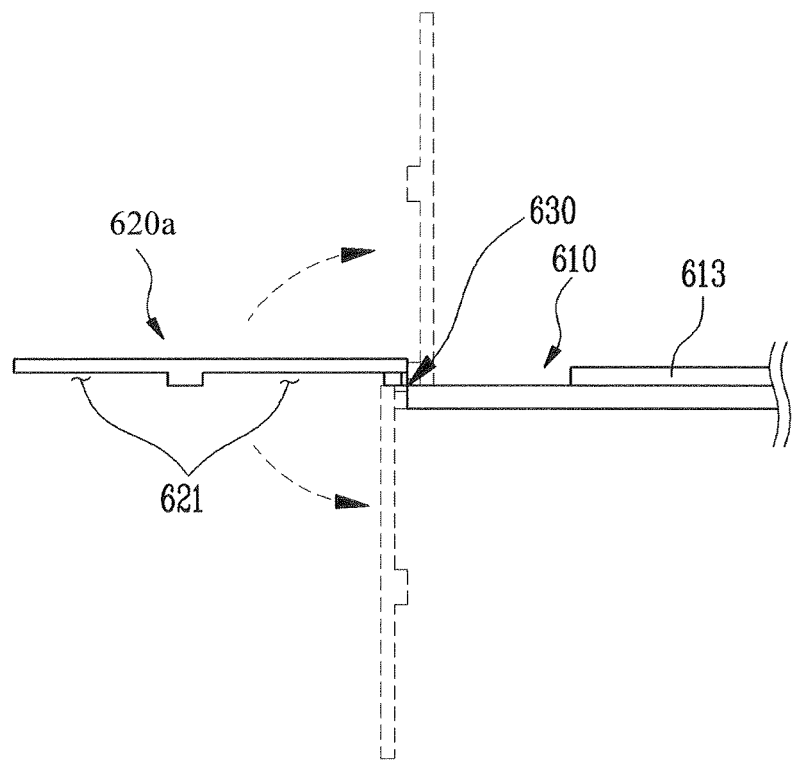
FIG. 14 is a plan view showing the top of a connecting structure of a first frame and a second frame of the cover frame constructed as another embodiment of the present invention.

FIG. 14 shows the top of a connecting structure of the first frame 610 and the second frame 620a of the cover frame 600.

Referring to FIG. 14, the second frame 620a extends from the first frame 610, and is linearly connected by a bending portion 630. Therefore, the second frame 620a may rotate at 90° to the left and right from the first frame 610, fully at 180°. The second frame 620b may have similar structure in comparison with the second frame 620a. Therefore, the bare cell 20 may be easily fixed by the second frames 620a and 620b, after being seated on the first frame 610. Further, a hinge may be used to connect the first and second frames 610, 620. That is, when the cover frame 600 is made of a material that is difficult to machine, such as wood, using a hinge for connection may be useful. As described above, since the second frames 620a and 620b can freely rotate, they can more easily fix to the cap assembly 21 and the bottom 24 of the bare cells 20 inside the cover frame 600.

Figure 15:
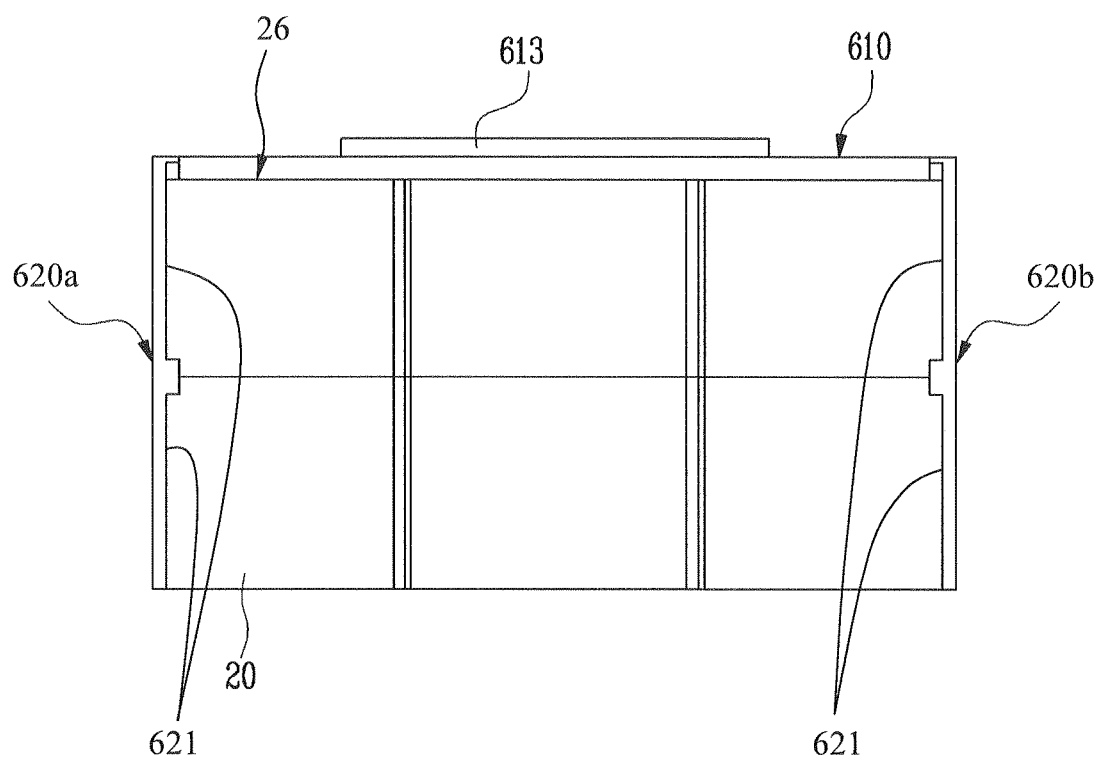
FIG. 15 is a plan view showing the top of an assembly of bare cells and the cover frame constructed as another embodiment of the present invention.

FIG. 15 shows the top of an assembly of a bare cell and a cover frame.

Referring to FIG. 15, the sides 26 of the cans of the bare cells 20 are in physical contact with the first frame 610, and the cap assemblies and the bottoms of the bare cells 20 are fixed to the second frames 620a and 620b. Therefore, the protection circuit module 30 disposed at the side of the bare cells 20 is received in the protection circuit module receiving portion 612 of the first frame 610, and the seat 611 of the first frame 610 is fitted on the sides of the bare cells 20. Further, the fixing portions 621 of the second frames 620a and 620b fix to the bare cells 20, covering the cap assemblies and the bottoms of the cells 20. Therefore, the bare cells 20 may be firmly fixed to the cover frame 600 without moving around within the cover frame 600.

The cover frame 600 may be manufactured by injection molding. For example, the cover frame 600 may be made of any one or more of glassfiber and fiberglass reinforced plastics formed by adding plastic reinforcement to the glassfiber, but is not limited thereto. The cover frame 600 is the same as the cover frame 200 shown in FIGS. 1, 3, and 5, other than those described above, and the detailed description is not provided.

Figure 16A:
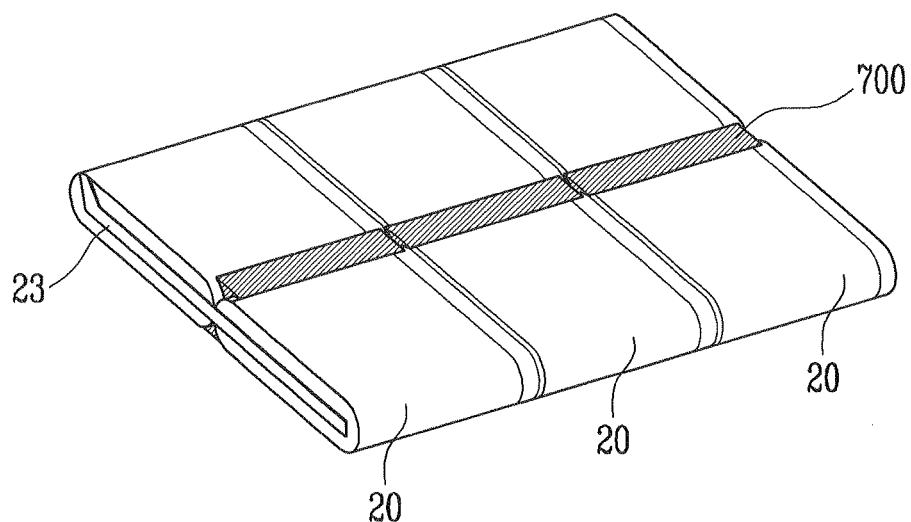
FIG. 16A is an oblique view showing an assembly of bare cells and a space constructed as another embodiment of the present invention.
Figure 16B:
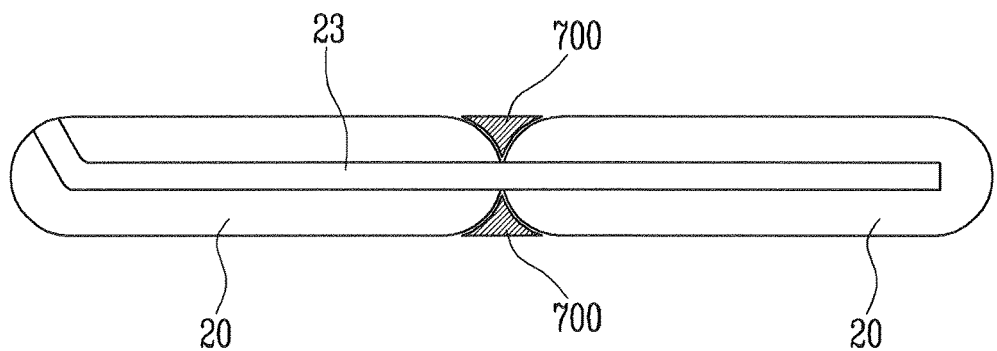
FIG. 16B is a side view of FIG. 16A showing an assembly of bare cells and a spacer constructed as another embodiment of the present invention.

FIG. 16A is an oblique view showing an assembly of bare cells and a space and FIG. 16B is side view of FIG. 16A.

Referring to FIGS. 16A and 16B, two series of the bare cells 20 are connected in parallel by an electrode lead 23 and the space between the bare cells 20 is filled with the spacer 700. The spacer 700 may be disposed on the top and the bottom of the bare cells 20 before the bare cells 20 are covered with the enclosure member 800 (see FIG. 11). The spacer 700 may be disposed before or after the bare cells 20 are received by the cover frame 600.

In general, the external shape of a battery pack depends on an electronic device equipped with the battery pack. That is, one or more series of bare cells are connected to each other in parallel, and then the protection circuit module is mounted on the bare cells. Thereafter, the bare cells including the protection circuit module are made of polymer resin in a shape fitting to the electronic device. The battery pack manufactured as described above becomes heavy because of the usage of the polymer resin and such battery packs disadvantageously have larger size.

The battery pack 500 constructed in this embodiment includes the cover frame 600 covering only one side of the rectangular bare cells 20 therein, and the enclosure member 800 covering the portion of the bare cell 20 which is exposed by the cover frame 600 (see FIG. 11). Therefore, it is not necessary to fill the space between the bare cells in order to make the external shape of the battery pack 500 flat. The spacer 700 may be further used to fill the space. That is, the battery pack 500 may further include the spacer 700 in the space between the bare cells 20 and the enclosure member 800 such that the surface of the enclosure member 800 and the surface of the first frame 610, which are in physical contact with each other, are parallel to each other.

The spacer 700 may be made of any one or more of polyethylene, polypropylene, polyethersulfone, polyphehyleneoxide, polyphenylene sulfide, polyimide, and polyethylene terephthalate. However, the spacer 700 only has to be an insulator and is not limited to the above-mentioned substances.

Figure 17:
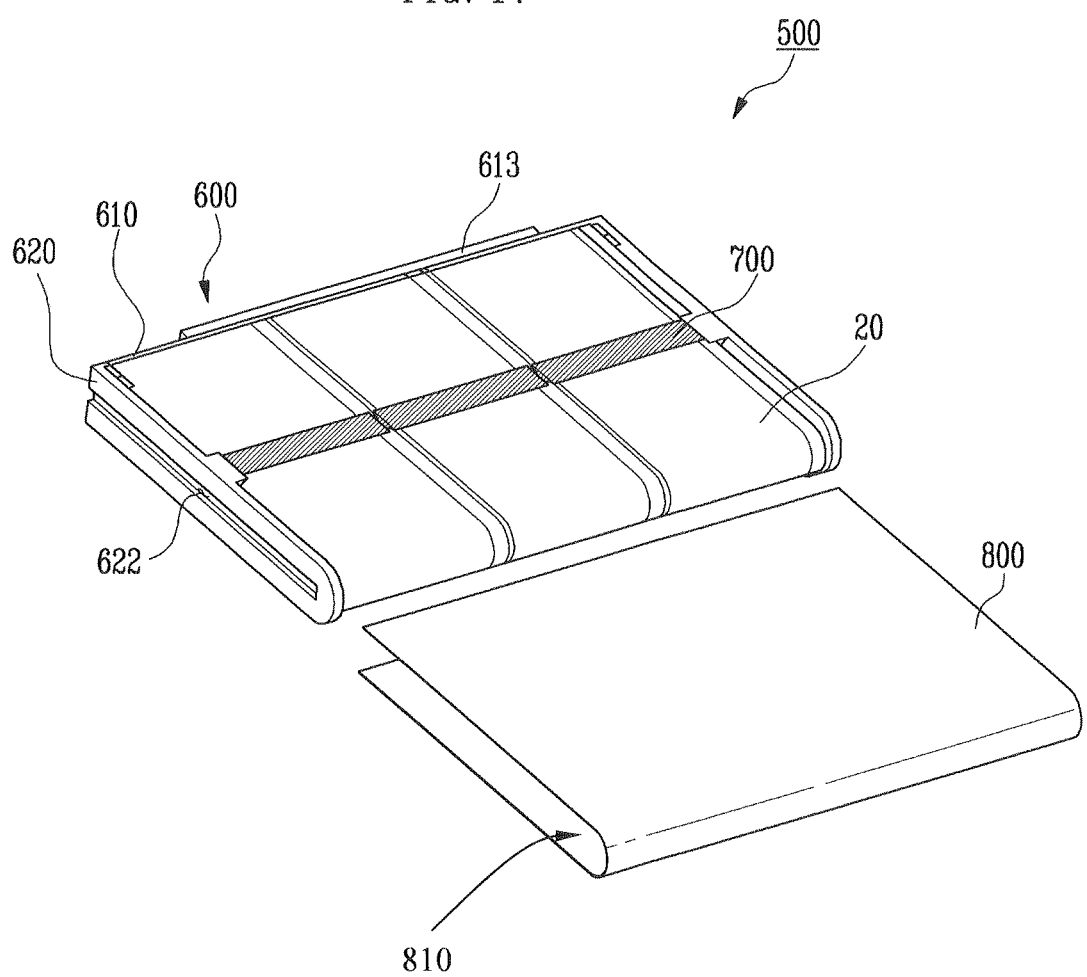
FIG. 17 is an oblique view showing a battery pack constructed as another embodiment of the present invention.

FIG. 17 is an oblique view of the battery pack according to this embodiment.

Referring to FIG. 17, the bare cell 20 is not exposed to the outside by the combination of the cover frame 600 and the enclosure member 800. That is, the enclosure member 800 may cover only the bare cells 20, or alternatively, cover the bare cells 20 and a portion of the first frame 610 of the cover case 600. Meanwhile, when the enclosure member 800 covers a portion of the first frame 610, particularly the external surface 611E of the seat 611, the connection force between the bare cells 20 and the cover frame 600 may be increased.

Further, referring to FIG. 17, the enclosure member 800 is made of an electrical insulating thin film. The enclosure member 800 may be made of PC (polycarbonate), but is not limited thereto. Further, an adhesive layer 810 may be further provided on the internal side of the enclosure member 800. The combination force between the enclosure member 800 and the bare cell 20 may be increased by the adhesive layer 810.

Figure 18:
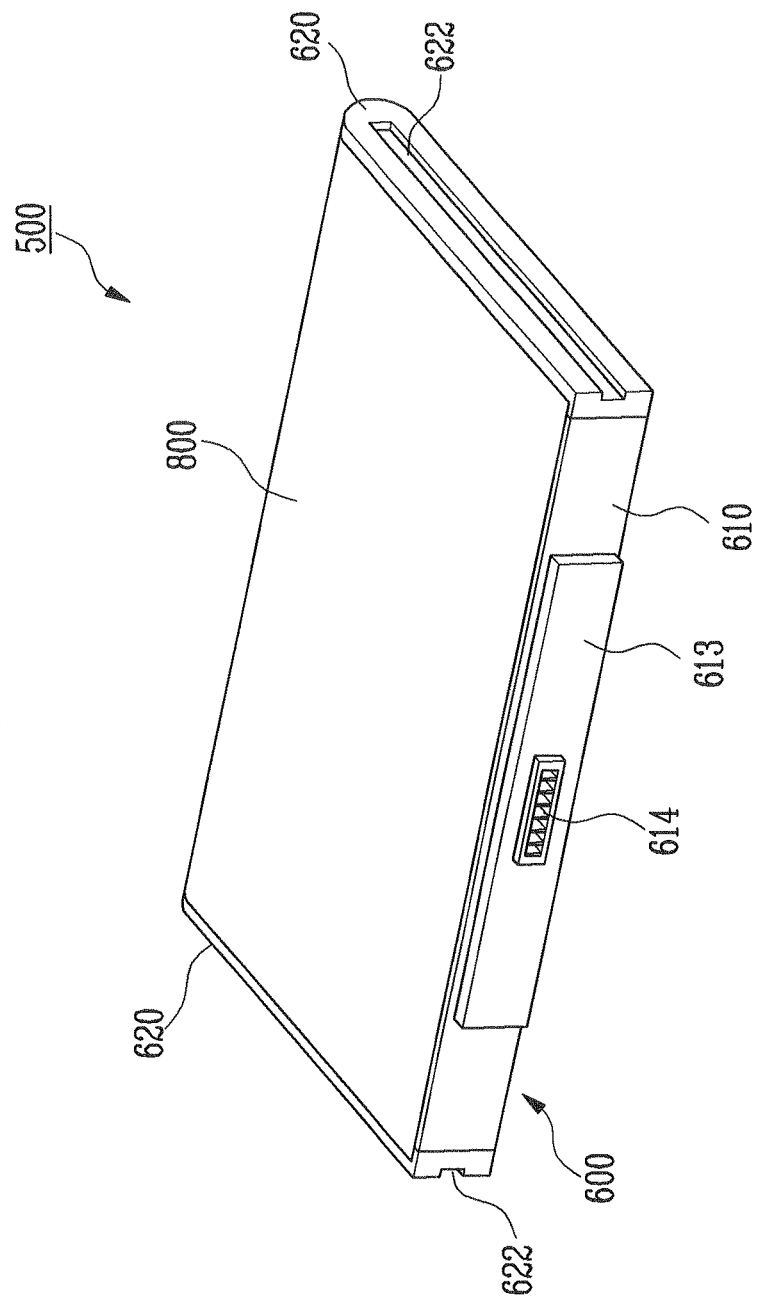
FIG. 18 is an oblique view showing a battery pack constructed as another embodiment of the present invention.

FIG. 18 is an oblique view of the battery pack according to this embodiment.

The battery pack 500 according to this embodiment includes the cover frame 600 and the enclosure member 800 covering the bare cells (not shown) in the battery pack 500 and a portion of the cover frame 600.

In the cover frame 600, the protection circuit module receiving portion 612 (see FIG. 13) is formed inside the first frame 610, and the protrusion 613 is formed at the opposite side corresponding to the receiving portion 612 of the first frame 610. The protrusion 613 has the terminal leading unit 614.

The protrusion 613 is formed to reduce the thickness of the first frame 610. That is, the protrusion 613 protrudes as much as the portion of the protection circuit module that exceeds the thickness of the first frame 610. Therefore, the protection circuit module 30 is received within the space defined by the protrusion 613 and the protection circuit module receiving portion 612 (see FIG. 13) included in the first frame 610. As described above, the necessity of formation of the protrusion 613 depends on the thickness of the first frame 610 or the size of the protection circuit module 30.

The terminal leading unit 614 that is on the external terminal of the protection circuit module 30 (see FIG. 18) is formed at the center of the protrusion 613. The external terminal 614 is electrically connected to an electrical terminal of an electronic device equipped with the battery pack 500. The terminal leading unit 614, as shown in the figures, may protrude, but is not limited thereto. Further, the position may be modified in various ways in accordance with the electronic devices equipped with the battery pack 500 according to this embodiment.

Figure 19:
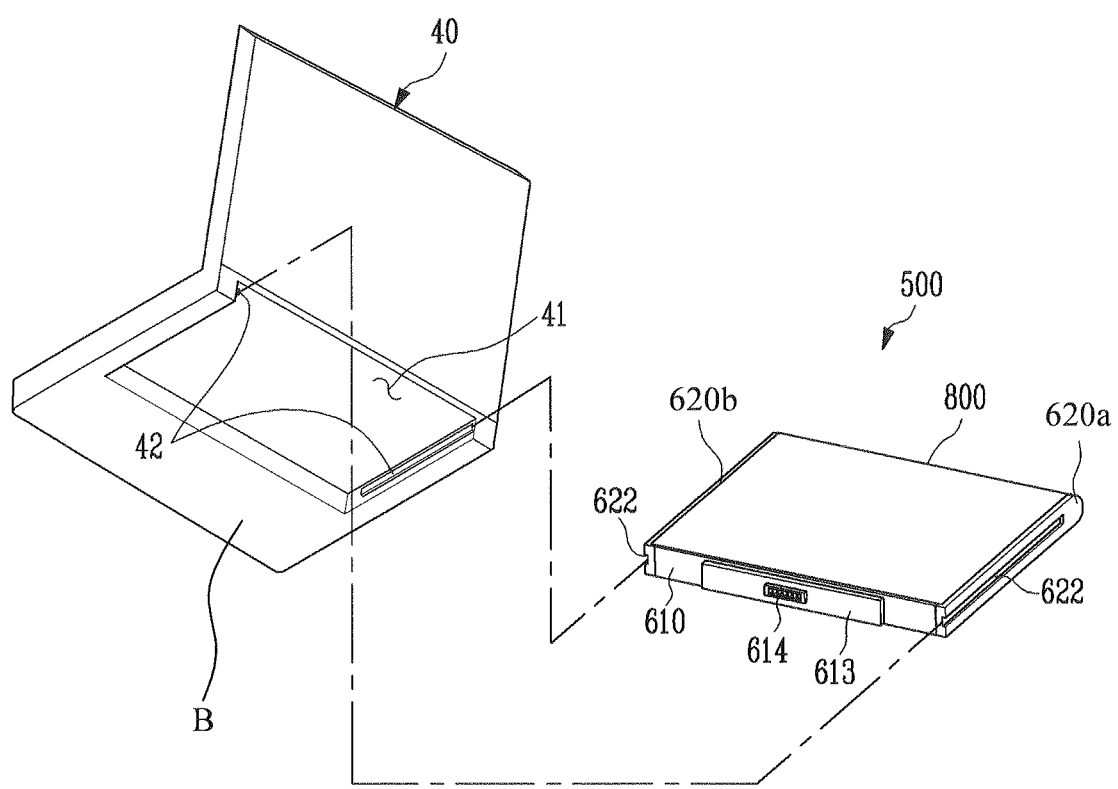
FIG. 19 is a view showing when a battery pack constructed as another embodiment of the present invention is mounted in the rear side of a laptop computer.

FIG. 19 is a view showing when a battery pack according to another embodiment of the present invention is mounted in the rear side of a laptop computer. Further, FIG. 20 is an oblique view of a laptop computer equipped with the battery pack installed.

Referring to FIG. 19, a power supply seat 41 to which the battery pack 500 is mounted is formed on the back edge B of a laptop computer 40. Fastening protrusions 42 are formed on two opposite sides inside the power supply seat 41. Further, fastening structures 622 are formed on two opposite sides of the battery pack 500, that is, the outer sides of the second frames 620a and 620b. The fastening structures 622 are grooves corresponding to the fastening protrusions 42. The grooves extend from the joint of the first frame 610 and the second frames 620a and 620b along the second frames 620a and 620b. Further, the fastening structures 622 are positioned in correspondence with the fastening protrusions 42. Therefore, the fastening structures 622 fit to and slide on the fastening protrusions 42. Therefore, the battery pack 500 is firmly fixed in place in the laptop computer 40.

Figure 20:
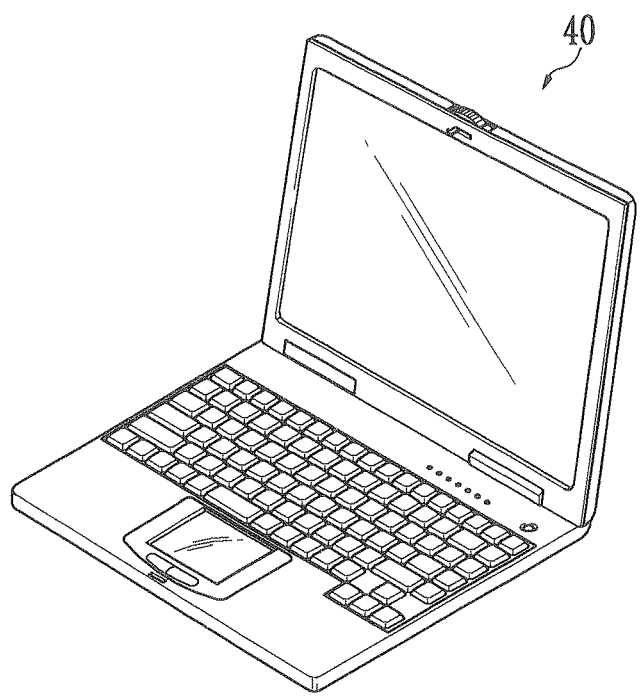
FIG. 20 is an oblique view showing a laptop computer equipped with a battery pack constructed as another embodiment of the present invention.

As shown in FIG. 20, the battery pack 500 is mounted in the laptop computer 40 by the fastening structures 622 of the battery pack, and the terminal leading unit 614 of the battery pack 500 is connected to a terminal in the seat 41 supply power to the laptop computer 40.

Recently, the weight and size of electronic devices, such as laptop computers, have been gradually reduced. It is required to manufacture light and slim battery packs for the electronic device, in order to satisfy the demand. Further, the battery packs require to have a flat surface, because they are usually mounted in the bottom of the laptop computers. Therefore, a battery pack according to the present invention does not need a specific case made of polymer resin. Therefore, the electronic devices equipped with the battery pack according to the present invention can be kept light and slim.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising;
   a plurality of bare cells, each having an electrode assembly arranged within a can, each of the bare cells including a cap assembly sealing an opening at a top of the can and opposite to a base, and a side connecting the cap assembly to the base, each of the bare cells being rounded in cross-section;
   a protection circuit module arranged on a portion of the side of the bare cells;
   a cover frame including a first frame covering the bare cells and the protection circuit module and two second frames attached to opposite ends of the first frame, the second frames comprising fixing portions having first recesses corresponding to the cap assembly and to the bases of the bare cells, the fixing portions rotating to an angle relative to the first frame to connect the plurality of bare cells to engage the cover frame with the cap assembly and bases of the bare cells, the fixing portions being on sides of the second frames that face the bare cells; and
   an enclosure member covering the bare cells.

2. The battery pack as claimed in claim 1, wherein the first frame covers the side of at least one of the bare cells and an entirety of the protection circuit module.

3. The battery pack as claimed in claim 1, wherein the first frame comprises:
   a second recess to receive the protection circuit module; and
   a seat adjacent to the second recess and having a shape corresponding to a shape of a side of the cans of the at least one of the bare cells to physically mate with the sides of the cans of at least one of the bare cells, the seat and the second recess both being arranged on a same side of the first frame.

4. The battery pack as claimed in claim 1, wherein the second frames are linearly extended from and connected to the first frame, and the second frames rotate through a 180° range at ±90° with respect to the first frame.

5. The battery pack as claimed in claim 1, wherein the cover frame is comprised of thermoplastic resin and one or more of glassfiber and fiberglass reinforced plastic.

6. The battery pack as claimed in claim 1, wherein the enclosure member is comprised of polycarbonate and further comprises an adhesive layer disposed on an inner surface of the enclosure member with the inner surface being in physical contact with the bare cells.

7. The battery pack as claimed in claim 1, further comprising a spacer filling a space between the bare cells and the enclosure member, the spacer being arranged external to the cans of the bare cells and being arranged between adjoining rows of the bare cells to provide a flat upper and lower surface of the plurality of bare cells for the enclosure member to adhere to.

8. The battery pack as claimed in claim 1, wherein the enclosure member further covers the bare cells exposed by the cover frame and covers a portion of the cover frame physically contacting the side of at least one of the bare cells.

9. The battery pack as claimed in claim 7, wherein the enclosure member further comprises an adhesive layer disposed on an inner surface of the enclosure member, the inner surface being in physical contact with the flat upper and lower surfaces of the plurality of bare cells.

10. The battery pack as claimed in claim 7, wherein the spacer is comprised of an electrical insulator selected from a group consisting of polyethylene, polypropylene, polyethersulfone, polyphehyleneoxide, polyphenylene sulfide, polyimide, and polyethylene terephthalate.

11. A battery pack, comprising:
   a bare cell arrangement having flat upper and lower surfaces and curved side edge surfaces, the bare cell arrangement including a plurality of bare cells arranged in a plurality of rows and columns and being electrically interconnected together, the bare cell arrangement further including a spacer comprised of an electrically insulating material and being arranged in between neighboring rows of the bare cells to produce the flat upper and lower surfaces of the bare cell arrangement, each of the bare cells including a can having an electrode assembly arranged within, a cap assembly sealing an opening at a top of the can and a bottom opposite to the cap assembly, and a sidewall connecting the cap assembly to the bottom;
   a protection circuit module arranged on and directly contacting only a portion of one of the curved side edge surfaces of the bare cell arrangement;
   a cover frame including a first frame and two second frames attached to opposite ends of the first frame, the first frame having a first side that includes:
      a recess to accommodate and cover the protection circuit module, and
      a seat on a remaining portion of the first side of the first frame, the seat having a curved surface that mates with the curved side edge surface of the bare cell arrangement that the protection circuit module is arranged on; and
   the second frames including fixing portions having recesses corresponding to the cap assembly and the bases of the bare cells, the second frames attaching the cover frame to each of the cap assembly and the bases of the bare cells, the fixing portions being on sides of the second frames that face the bare cells and the fixing portions rotating to an angle relative to the first frame to connect the plurality of bare cells and engage the cover frame with the cap assembly and bases of the bare cells; and
   an enclosure member covering the flat upper and lower surfaces of the bare cell arrangement.

12. The battery pack as claimed in claim 11, wherein the battery pack is used for a laptop computer, the battery pack further comprises fastening structures arranged at an exterior of the battery pack and at two opposite sides of the battery pack by being arranged on an external side of the second frames in order to combine the battery pack to the laptop computer.

13. The battery pack of claim 12, the fastening structures each being a long linear groove that correspond to and fit to fastening protrusions on opposite sides of a power seat of the laptop computer.

14. The battery pack of claim 11, wherein each of the second frames being able to rotate through an angle range of 180 degrees with respect to the first frame.

15. The battery pack of claim 11, wherein each bare cell within a row being connected in series, and each row being connected in parallel to remaining rows of the bare cell arrangement.

\* \* \* \* \*